Patented Aug. 14, 1934

1,969,832

UNITED STATES PATENT OFFICE 1,969,832

METHOD OF FREEZING FISH AND OTHER FOODSTUFFS

Harry R. Beard, Vancouver, British Columbia, Canada, assignor to New England Fish Company, Boston, Mass., a corporation of Maine No Drawing. Application April 11, 1929, Serial No. 354,446

8 Claims. (Cl. 99—14)

This invention relates to methods of freezing fish and other foodstuffs, and is especially concerned with the freezing of foodstuffs by refrigerated air or other gaseous mediums.

Among the chief difficulties encountered in freezing articles of food, and especially fish, may be mentioned the following:

Where liquid refrigerants are used, particularly in direct-contact methods of freezing, the articles are penetrated by the brine or other refrigerant, resulting in impairment of flavor and color, and laying a basis for rapid autolization upon defrosting. Furthermore, such methods are almost of necessity limited to the employment of sodium chloride solutions, since penetration of other refrigerants is still more undesirable. This limits the degree at which the freezing may be conducted, since the lowest temperature practically attainable with a saturated sodium chloride solution is about —6.16 degrees F., and for some articles, such as certain kinds of fish, lower temperatures are at times desirable.

Other methods of freezing by liquid refrigerants attempt to overcome these disadvantages by the employment of liquid-tight containers for the articles being treated, but it is obvious that such methods involve additional expense in the cost of the containers, their handling, the maintenance of them in tight condition, and more especially the obtaining of good contact between the inside of such containers and the objects to be frozen. This is particularly true of poultry and whole or dressed fish, because of their irregular shapes.

For these and other reasons, such, for example, as flexibility and range of temperature control, methods of freezing by air or other gaseous mediums are practiced. With such air-freezing methods, as heretofore in use, there has been a serious disadvantage in that the air desiccates the objects being frozen and deposits the moisture as a frost-like condensate on the cooling coils of the treating chamber. This is particularly true with slices or fillets of fish or meat, the surfaces of which, being unprotected by the natural skin, give off moisture freely to the surrounding air.

The present invention contemplates the prevention or minimization of such desiccation, when applied to methods heretofore used, as by applying an ice glaze at an early stage of the freezing process, and is also useful as an added precaution in the high-speed air-freezing method disclosed in my copending application, Serial No. 354,445, filed April 11, 1929. In the latter instance, an air current at low freezing temperatures is passed over the articles at a high rate of speed, between 300 feet and 5000 feet per minute, especially at a speed falling within a middle zone between said two limits; and, by adding a glaze at an early stage of that process, I have found that the very rapid rate of freezing with all its attendant advantages is maintained, while the retention of the moisture of the articles is so much improved, and the exclusion of brine penetration and other deleterious substances is rendered so nearly complete, that an exceptionally good product results.

Specifically, my invention contemplates the provision, in air-freezing methods, of a method for positively guarding against desiccation, which includes effecting, at an early stage of the air-freezing process, a glazing of the articles being frozen, by applying an ice glaze, either by means of brushing them with, or dipping them in, water, or by flowing or spraying water over them, and maintaining the ice glaze during the entire freezing process.

In carrying out my method, I initiate freezing of the articles, preferably by commencing the same at a very low temperature and a rapid rate of freezing, and as soon as a thin stratum or outer layer of the articles is frozen I apply water (in any suitable manner, such as indicated hereinbefore, but preferably by a spray) which forms an ice glaze completely covering the surface of each article.

The freezing process is then continued, either at a low rate or at a high rate, and at a very low temperature or a moderately low temperature, dependent in any case upon the nature of the articles being treated, some of which will require one set of freezing conditions and others of which will require other sets of conditions, in order to obtain a frozen product of the best quality. The initial freezing, however, is preferably, though not essentially, effected at a rapid rate, in order that the glaze may be applied as soon as possible in the freezing process so as to prevent desiccation, it being understood that a very thin layer, well frozen, is sufficient to freeze the water into a good glaze. Since the freezing of the inner layers or strata will not take place faster than the heat can be conducted through them to the surface, a very rapid initial freezing will not be noticeably detrimental even to that relatively small class of articles which are best frozen slowly, since only a thin surface layer need be frozen to apply the ice glaze.

As soon as the articles are glazed, any loss of moisture from the articles being treated is prevented, and if the freeezing air is in a condition which will take up moisture it will do so from the glaze itself. For this reason, if the freezing is thereafter conducted slowly or at a moderately low temperature, or if the objects being frozen are large or thick, necessitating a long freezing period, I propose to renew the glaze at periodic intervals during the freezing process. I have found, however, that if the articles, after initial freezing, are well glazed, such glaze will last for a period even as long as several hours. An ice glaze, I have found, just as readily conducts the heat, out of the objects during freezing, as the surface of the objects themselves.

What I claim is:—

1. In a method of freezing fish or other foodstuffs, those steps which consist in subjecting the articles to the action of a refrigerated gaseous medium, in applying an air-excluding coating of ice glaze to the articles at an early stage of the freezing process, in continuing the freezing by said medium, and in renewing said glaze periodically during the freezing period.

2. The method of freezing fish or other foodstuffs which consists in initiating freezing of the articles by air, subjecting them to a watery liquid at an early stage of the freezing process until a glaze is formed on their surfaces, and continuing the freezing process by air.

3. The method of freezing fish or other foodstuffs, which consists in initiating freezing of the articles by a refrigerated gaseous medium at a rapid rate to form a thin frozen layer, subjecting them to a watery liquid at an early stage of the freezing process until a glaze is formed on their surfaces, and continuing the freezing process by said medium at a temperature and rate suited to the particular articles being treated.

4. The method of freezing fish or other foodstuffs, by a refrigerated gaseous medium, which includes exposing the articles to said medium until their surface layers only are frozen, contacting them with water until an ice glaze is formed on their surfaces, and continuing the freezing by said medium.

5. The method of freezing fish or other foodstuffs, by a refrigerated gaseous medium, which includes exposing the articles to said medium until their surface layers only are frozen, spraying them with water until an ice glaze is formed on their surfaces, and continuing the freezing by said medium.

6. In a method of freezing fish or other foodstuffs, the procedure which includes lowering the temperature of the article by a relative circulation of a refrigerated gaseous medium, utilizing its thus created heat-absorption power to aid in freezing a water film on its surface, contacting the article with water to produce said film at an early stage of the freezing process and then continuing the freezing by said relative circulation of the freezing medium.

7. In a method of freezing fish or other foodstuffs, the procedure which includes lowering the temperature of the article by a relative circulation of a refrigerated gaseous medium, utilizing its thus created heat-absorption power to aid in freezing a water film on its surface, spraying water on the article to produce said film at an early stage of the freezing process and then continuing the freezing by said refrigerated gaseous medium.

8. In a method of freezing fish or other foodstuffs, the procedure which includes subjecting the articles to the freezing action of a current of refrigerated gaseous medium having a rate of movement of between 300 and 5000 feet per minute relative to the articles; contacting the articles with water after a few minutes of such freezing treatment, that is, as soon as the surface layers only of the articles are brought below freezing temperature, to form an ice glaze thereon; and continuing the freezing by said high speed refrigerated gaseous medium.

HARRY R. BEARD.